United States Patent Office 2,765,355
Patented Oct. 2, 1956

2,765,355

PRODUCTION OF METHYLCYCLOPENTENE

Kenzie Nozaki, El Cerrito, Calif., assignor to Shell Development Company, Emeryville, Calif., a corporation of Delaware No Drawing. Application October 6, 1953,
Serial No. 384,517

5 Claims. (Cl. 260—666)

This invention relates to the production of methylcyclopentene by the catalytic dehydrogenation of methylcyclopentane with a special platinum catalyst and under selected conditions.

The objects of the invention are to produce an improved process for the production of methylcyclopentene which is applicable with readily available raw materials, affords improved yields, and, due to the production of lesser by-product, allows the desired methylcyclopentene to be more easily and economically recovered from the reaction product.

Methylcyclopentene is a desirable chemical which has application in the synthesis of various insecticides, resin intermediates, and related products. For use in such syntheses, methylcyclopentene of fairly high technical purity is required. One of the most common impurities is benzene, and this impurity is particularly undesirable in some of the most important applications of methylcyclopentene. On the other hand, benzene is normally produced in considerable quantities in the methods hitherto used for the production of methylcyclopentene and its separation from the methylcyclopentene is most difficult and costly.

Various attempts have been made in the past to produce methylcyclopentene by the catalytic dehydrogenation of methylcyclopentane, but the conversion efficiency has invariably been too low for an economically attractive process. Various catalysts including the oxides of aluminum, vanadium, chromium, molybdenum, and titanium, have been tried and these oxides have been applied in combination with various porous carrier materials such as alumina, activated carbon, and the like. None of them has been found to be superior to chromia-alumina catalyst. The results which may be obtained using this catalyst are reported by Heinemann (Ind. Eng. Chem. 43, pages 2098–2101 (1951)). The pertinent results are shown with the calculated conversion efficiencies in the following Table I.

TABLE I

*Variation of operating conditions in dehydrogenation of methylcyclopentane over chromia-alumina catalyst*

| Reaction Conditions | | | Product Distribution, Weight Percent of Charge | | | | | | Conversion Efficiency |
|---|---|---|---|---|---|---|---|---|---|
| Temp., °F | Liquid Space Velocity, Vol./Vol./Hr. | Pressure | Monoolefin | Diolefin | Benzene | Gas | Coke | Conversion | |
| 950 | 2.0 | Atm | 4.7 | 1.1 | 4.8 | 3.5 | 6.1 | 20.2 | 23 |
| 950 | 1.0 | Atm | 5.4 | 1.0 | 6.9 | 4.7 | 7.2 | 25.2 | 21 |
| 950 | 2.0 | Reduced* | 3.2 | 1.6 | 7.2 | 1.0 | 3.5 | 16.5 | 19 |
| 1,050 | 0.5 | do | 3.6 | 1.5 | 8.3 | 11.7 | 15.0 | 40.1 | 9 |
| 1,050 | 1.0 | do | 6.4 | 1.7 | 4.3 | 4.9 | 12.5 | 29.9 | 21 |
| 1,050 | 2.0 | do | 10.5 | 1.9 | 0.8 | 3.3 | 9.7 | 26.2 | 40 |
| 1,050 | 3.0 | do | 2.1 | 0.8 | 4.5 | 1.0 | 3.3 | 11.7 | 18 |
| 1,150 | 3.0 | do | 3.7 | 1.3 | 9.5 | 2.6 | 5.4 | 22.5 | 16 |
| 1,150 | 2.0 | do | 6.5 | 2.0 | 3.8 | 3.5 | 10.6 | 26.4 | 25 |

* 10 to 100 mm. Hg.

It will be noted that the maximum production of methylcyclopentene is obtained when operating at 1050° F., LHSV 2 under vacuum with a conversion of methylcyclopentane of 26.2%. The conversion to methylcyclopentene is only 10.5%. The efficiency is, therefore, approximately 40%. In all cases, an appreciable amount of coke is formed which not only represents loss of feed but also necessitates very frequent regeneration of the catalyst.

The results, using chromia-alumina catalyst may be improved by operating in the presence of hydrogen. This is illustrated in the results shown in the following Tables II and III.

TABLE II

*Effect of addition of hydrogen in dehydrogenation of methylcyclopentane over chromia-alumina catalyst*

| Operating Condition | | | | | | | | | | |
|---|---|---|---|---|---|---|---|---|---|---|
| Temp., °F | Liquid Space Velocity, Vol./Vol./Hr. | Pressure | $H_2$:Oil Mole | Monoolefin | Diolefin | Benzene | Gas | Coke | Conversion | Conversion Efficiency |
| 1,050 | 1 | Reduced* | 0 | 6.4 | 1.7 | 4.3 | 5.0 | 12.5 | 29.9 | 21 |
| 1,050 | 1 | Atm | 3.0 | 9.6 | 1.4 | 5.2 | 1.8 | 11.3 | 29.3 | 33 |
| 1,150 | 3 | Reduced* | 0 | 3.7 | 1.3 | 9.5 | 2.6 | 5.4 | 22.7 | 16 |
| 1,150 | 1 | Atm | 3.0 | 16.9 | 0.1 | 12.1 | 2.2 | 17.4 | 48.7 | 34 |

* 10 to 50 mm. Hg.

TABLE III

*Effect of variation of space velocity and hydrogen-oil ratio*

Catalyst, $Cr_2O_3$–$Al_2O_3$
Temperature, 1,050° F.
Catalyst to oil ratio, 2:1
Feed, 90% MCP+10% benzene
Pressure, atmospheric

|  | Liquid Space Velocity, 1 Vol./Vol./Hour | | | Liquid Space Velocity, 2 Vol./Vol./Hour | |
|---|---|---|---|---|---|
| Hydrogen-oil, mole ratio | 7.0:1 | 3.0:1 | 1.5:1 | 1.5:1 | 0.75:1 |
| Mono-olefins, wt. percent of MCP | 8.7 | 14.1 | 13.7 | 9.4 | 8.7 |
| Diolefins, wt. percent of MCP | 3.8 | 3.1 | 2.4 | 3.1 | 2.8 |
| Benzene, wt. percent of MCP | 8.9 | 6.6 | 5.1 | 8.1 | 9.8 |
| Gas, wt. percent of MCP | 4.4 | 4.9 | 3.6 | 2.6 | 2.7 |
| Coke, wt. percent of MCP | 1.4 | 3.6 | 6.8 | 4.1 | 4.6 |
| Conversion, wt. percent of MCP | 27.2 | 32.3 | 31.6 | 27.3 | 28.6 |
| Conversion Efficiency | 32 | 44 | 43 | 34 | 30 |

It will be noted that when operating in the presence of hydrogen, the maximum conversion to methylcyclopentene is 14.1% with a total conversion of 32.3% which corresponds to a conversion efficiency of about 44%. It will also be noted that while the coke production is decreased slightly by the application of hydrogen, it is still material and too high to allow continuous operation. It will also be noted that, as the amount of hydrogen is increased, more of the methylcyclopentane is converted to benzene. Thus, when employing 7 moles of hydrogen per mole of methylcyclopentane, more benzene is produced than methylcyclopentene.

It has been reported that the conversion of methylcyclopentane to methylcyclopentene may be improved somewhat by supplying a certain amount of benzene in the feed to the reaction zone. However, the improvement is marginal and insufficient to make the process attractive for commercial operation.

Referring to the above table, it will be seen that the maximum conversion to methylcyclopentene is still only 15% at 35% conversion. The maximum conversion efficiency is 43% and the minimum coke production is 2.6% by weight of the feed.

It has now been found that methylcyclopentene may be produced much more efficiently and in considerably higher yields from methylcyclopentane by catalytic dehydrogenation with a platinum catalyst provided that certain precautions are taken. The data given in the following Table V illustrate the results that may be obtained under mild operating conditions.

TABLE IV

*Effect of benzene concentration in feed stock*

[Ind. Eng. Chem. 43, 2101 (1951)]

Catalyst, $Cr_2O_3$–$Al_2O_3$
Liquid space velocity, 1 vol./vol./hour
Hydrogen to oil ratio, 3.5 mole
catalyst to oil ratio, 2:1
Pressure, atmospheric
Temperature, 1050° F.

| MCP in charge, percent | 100 | 99.8 | 99.5 | 99.2 | 99.0 | 98.0 | 95.0 | 90.0 | 80.0 |
|---|---|---|---|---|---|---|---|---|---|
| Benzene in charge, percent | 0 | 0.2 | 0.5 | 0.8 | 1.0 | 2.0 | 5.0 | 10.0 | 20.0 |
| Mono-olefins, wt. percent of MCP | 12.1 | 11.8 | 11.5 | 11.2 | 12.2 | 12.1 | 13.3 | 13.5 | 15.0 |
| Diolefins, wt. percent of MCP | 3.7 | 3.0 | 3.5 | 3.8 | 2.3 | 3.6 | 3.8 | 3.9 | 3.1 |
| Benzene, wt. percent of MCP | 9.5 | 9.2 | 8.7 | 8.9 | 10.4 | 8.8 | 9.3 | 10.0 | 9.9 |
| Gas, wt. percent of MCP | 2.8 | 3.1 | 1.4 | 3.5 | 1.8 | 2.7 | 3.4 | 2.2 | 3.1 |
| Coke, wt. percent of MCP | 6.5 | 5.8 | 2.6 | 2.1 | 3.0 | 2.8 | 3.6 | 3.5 | 3.9 |
| Conversion, wt. percent of MCP | 34.6 | 32.9 | 27.7 | 29.5 | 29.7 | 30.0 | 33.4 | 33.1 | 35.0 |
| Conversion Efficiency | 36 | 36 | 42 | 38 | 41 | 40 | 40 | 41 | 43 |

In all cases the coke production was negligible, being less than 0.2% of feed. It should be noted that very little benzene is produced and that the conversion efficiency is nearly doubled.

TABLE V

*Dehydrogenation of methylcyclopentane with platinum-silica catalyst*

Conditions:
Temperature, 450° C.
Pressure, atmospheric
Hydrogen/oil mole ratio, 3:1

| Experiment No | Feed | 393 | 405 | 406 | 423 | 437* |
|---|---|---|---|---|---|---|
| LHSV |  | 2.8 | 5.1 | 4.7 | 1.3 | 1.3 |
| WHSV |  | 4.8 | 4.8 | 4.8 | 1.4 | 1.4 |
| Liquid Product, Mole Percent: |  |  |  |  |  |  |
| Methylcyclopentane | 95.7 | 71.3 | 71.2 | 70.9 | 71.2 | 70.0 |
| Methylcyclopentene | 0.43 | 20.2 | 20.2 | 21.0 | 20.0 | 21.0 |
| Methylcyclopentadiene |  | 2.4 | 2.3 | 2.5 | 2.5 | 4.7 |
| Benzene | 1.02 | 3.0 | 2.5 | 2.7 | 3.3 | 2.5 |
| Cyclohexanes | 2.70 | 0.9 | 1.0 | 0.5 | 0.2 | 0.8 |
| Hexanes | <1.0 | 2.3 | 3.0 | 2.3 | 2.8 | 1.0 |
| Gas, Mole Percent: |  |  |  |  |  |  |
| $CH_4$ |  | <0.1 | 0.12 | 0.06 | 0.05 | 0.8 |
| Other Hydrocarbons |  | 0.01 | 0.20 | 0.14 | 0.07 | 0.1 |
| Conversion, MCP, Moles |  | 24.4 | 24.6 | 24.8 | 22.8 | 26.1 |
| Conversion, mole percent |  | 25.4 | 25.7 | 25.9 | 24.2 | 27.1 |
| Conversion Efficiency |  | 80 | 79 | 81 | 83 | 78 |

* Hydrogen/MCP mole ratio equals 1.0. Feed is 96.1% MCP.

In the above, the conversion efficiency refers to the production of methylcyclopentene and any methylcyclopentadiene produced is treated as an undesired byproduct. Methylcyclopentadiene can however be efficiently and selectively hydrogenated in the presence of methylcyclopentene to yield additional amounts of methylcyclopentene. If the amount of methylcyclopentadiene in the product is quite small, it is not economically attractive to apply selective hydrogenation for the purpose of increasing the yield of methylcyclopentene. Small amounts of the diolefin in the product may be removed by various refining methods. For example, the diene may be reacted with one of the known agents which react with diolefins by 1–4 addition (Diels-Alder reaction), and the monolefin may be then distilled from the adduct. However, if the concentration of methylcyclopentadiene in the product is appreciable, its selective hydrogenation to methylcyclopentene is a practical method for increasing the yield of methylcyclopentene appreciably.

By applying more severe dehydrogenation conditions, considerable concentrations of methylcyclopentadiene may be produced along with the methylcyclopentene, thereby considerably increasing the production of methylcyclopentene (through subsequent selective hydrogenation) without materially decreasing the conversion efficiency. Thus, the conversion efficiencies obtained under more severe dehydrogenation conditions are indicated by the results shown in the following Table VI. In this case, the conversion efficiency is defined as 100 times the moles of methylcyclopentene+methylcyclopentadiene produced, divided by the total number of moles of methylcyclopentane reacted.

sodium silicate contains appreciable concentrations of sodium aluminate as impurity, and the aluminum is largely retained in the silica gel produced from such sodium silicate. For example, if silica gel is produced from Philadelphia Quartz E Brand sodium silicate by adding it to sulfuric acid and washing the resulting hydrogel at about pH 7 until free of sodium salts, the resulting silica gel is found to contain approximately 0.2 to 0.3% $Al_2O_3$. This amount of alumina in the silica gel, it is found, is sufficient to render it unsuitable as a carrier for the platinum of the present process. Even silica gel prepared by hydrolyzing reagent grade ethyl silicate and washing the resulting gel with water is found to contain appreciable amounts of alumina which exert a pronounced effect on the catalytic properties of the material. If, however, the hydrolysis product is thoroughly washed in the hydrogel state with strong acid or with a solution of methylene blue, the alumina may be substantially completely eliminated. Silica gel containing alumina impurity may be purified and thereby rendered suitable by dissolving it in pure alkli, e. g., potassium hydroxide, reprecipitating the silica under strongly acid conditions and washing. By repeating this series of steps, it is possible to reduce the concentration of alumina to quite low values. Thus, the catalyst used in Experiment No. 393, Table V, was produced with a silica gel purified by repeating the mentioned procedure until the concentration of alumina was reduced to about 0.001%. The silica gel used in preparing the catalyst used in Experiment No. 406, Table No. V, and all experiments shown in Table VI, contained 0.006% $Al_2O_3$ and that used in Experiment No. 405, Table No. V, contained 0.06% $Al_2O_3$. In order to produce a satis-

TABLE VI

*Dehydrogenation of methylcycopentane with platinum-silica catalyst under more severe conditions*

[Liquid hourly space velocity 1.3. Weight hourly space velocity 1.4.]

| Experiment No | | | 428C | 428D | 428E | 437A | 437B | 437C |
|---|---|---|---|---|---|---|---|---|
| H₂/Feed, Mole Ratio | | | 3.0 | 3.0 | 3.1 | 1.1 | 1.0 | 1.0 |
| Temperature, °C | | | 500 | 500 | 550 | 500 | 500 | 530 |
| Pressure, p. s. i. g | | | 30 | 0 | 0 | 33 | 0 | 0 |
| Feed | | | B | A | A | B | B | B |
| Liquid Product, Mole Percent: | Feed A | Feed B | | | | | | |
| Methylcyclopentane | 94 | 96.1 | 62.1 | 47.0 | 53.4 | 54.5 | 58.5 | 70.6 |
| Methylcyclopentene | 0.7 | ---- | 23.0 | 31.7 | 18.4 | 20.9 | 23.6 | 12.4 |
| Methylcyclopentadiene | ---- | ---- | 4.8 | 14.8 | 20.1 | 4.6 | 12.7 | 11.3 |
| Benzene | 2.2 | 1.0 | 4.2 | 4.2 | 5.9 | 7.8 | 3.8 | 4.0 |
| Cyclohexane | 0.8 | 2.3 | 0.1 | 0.1 | 0.5 | <0.1 | 0.7 | 1.2 |
| Hexanes | 2.3 | 0.6 | 5.8 | 2.1 | 1.6 | 10.3 | 0.8 | 0.4 |
| Gas, Mole Percent: | | | | | | | | |
| CH₄ | | | 0.4 | 0.2 | 0.6 | 8.3 | 1.4 | <0.1 |
| Other Hydrocarbons | | | 1.1 | 0.2 | 0.1 | 6.6 | 0.1 | 1.4 |
| Conversion, Percent Moles: | | | | | | | | |
| Conversion, mole percent | | | 34 | 50 | 43 | 43 | 39 | 27 |
| Conversion Efficiency | | | 82 | 93 | 89 | 59 | 93 | 88 |

In order to obtain high selectivities with sustained conversion, it is essential that a special catalyst be employed. This catalyst consists essentially of platinum combined with special silica gel. Various conventional high surface materials such as activated alumina, magnesia, Vycor glass, and activated carbon have been tried and found to be unsuited; with platinum they give catalysts which are either of low activity or which lose their catalytic activity very quickly during use. Ordinary silica gel combined with platinum is also not suitable since the catalyst produces excessive amounts of side reaction products and quickly loses its activity. This deficiency of silica gel has been traced to the alumina impurity which it normally contains. Even traces of alumina exert pronounced effects on the catalytic properties of silica gel. Silica gel is produced from sodium silicate which in turn is produced by fusing sand with alkali. The commercial factory catalyst, the alumina content of silica gel should be below about 0.1% and preferably not above about 0.06%. The platinum content of the catalyst is also relatively important. The catalyst should contain less than about 0.5% platinum. If the concentration of platinum is above about 0.5%, considerable amounts of benzene are produced. As the platinum concentration is decreased the efficiency improves with respect to the reaction and also with respect to the utilization of the platinum. For example, a catalyst containing 0.1% platinum gives a higher production of methylcyclopentene at a weight hourly space velocity of 4.8 than a catalyst containing 0.4% platinum at four times this space velocity (i. e., 19.3). Thus, from the standpoint of efficiency, it is advantageous to use low platinum concentrations, e. g., below about 0.25%. On the other hand, the amount of catalyst required to achieve a given conversion increases as the concentration of platinum is decreased. Consequently, a lower limit is set by economic considerations. Thus, while concentrations as low as 0.01% platinum can be used, it will generally be found more desirable to use concentrations of at least about 0.05%.

It is also found that efficiency of the catalyst depends somewhat upon the size of the catalyst particles and that there is a correlation between the size of the catalyst particles and the platinum content. The conversion efficiency increases with decreasing particle size. While particles up to about 3/8 inch average diameter may be employed, (particularly with low platinum concentrations), particles of half this size or less are to be preferred, and this is especially so when the platinum concentration is above about 0.25%. Thus, a good selectivity may be obtained with the larger size particle by retaining the platinum content in the low preferred range, or with fine catalyst particles and platinum concentrations in the upper range. While the most selective operation is obtained with particles of 2/16 inch or under with platinum concentrations below about 0.25%, the advantages of high activity, coupled with low pressure drop, make the use of the upper range of platinum concentrations with the larger particles also feasible. The surface areas of the catalysts prepared with the pure gel of silica are at least 100 square meters per gram and may be as high as 800 square meters per gram.

The platinum may be incorporated with the silica in any one of the conventional manners but is preferably incorporated by impregnating the dried gel with a solution of a soluble platinum compound such as chloroplatinic acid, the ammonium complex of platinum chloride, tetramine platinous nitrate, tetramine platinous hydroxide, or the like. It is also possible to incorporate the platinum in the gel by impregnating the gel with a sol of platinum or platinum sulfide. It is desirable, but not essential, to impregnate the gel in such a manner that the platinum concentration is highest near the outside of the particles rather than evenly distributed throughout the depth of the particle.

The catalyst may, if desired, contain one or more additional components which may, for example, serve as a lubricant in pelleting, a binding agent to improve the mechanical strength of the pellets, a trace of alkali, or the like.

Any additional component should not, however, in itself exert any appreciable dehydrogenation effect and most important, it should not impart any appreciable acidity to the catalyst. Such materials as alumina, magnesia, zirconia, beryllia impart acidity when present with the silica.

After incorporating the platinum with the silica, the material may be dried, calcined, and then reduced in a current of hydrogen. If desired, the reduction may be allowed to take place during use of the catalyst.

The catalyst may be used in the form of broken fragments or formed pellets, or it may be used in the form of a finely divided powder. In the former cases, the catalyst is advantageously used in the form of a fixed or moving bed in a suitable reactor while the vapors of the methyl-cyclopentane are passed through it. In the latter case, the known fluidized catalyst technique is utilized.

The reaction is preferably carried out under slightly raised pressures, e. g., 20–100 pounds/square inch absolute. However, lower pressures, including partial vacuum, and pressures up to several hundred pounds per square inch may be used if desired. Lower pressures are useful since they allow relatively severe conditions to be employed without inordinately increasing the reaction temperature. Higher pressures tend to give relatively less severe reaction conditions and a cleaner and more selective reaction. In a preferred operation a moderate pressure is applied while maintaining a relatively low partial pressure of methyl-cyclopentane by applying a hydrogen-containing gas such as recycled product gas.

The maximum possible conversions to methylcyclopentene and methylcyclopentadiene are limited in any case by the thermodynamic equilibria which in turn are determined by the conditions of temperature and pressure of hydrogen present. A few points on typical equilibrium curves are given in the following tables:

Methylcyclopentane→Methylcyclopentene
3 Moles H₂/Mole Methylcyclopentane
(Methylcyclopentene/Methylcyclopentane+Methylcyclopentene) ×100

| Temperature | Pressure, 1 Atmosphere | Pressure, 3 Atmospheres |
| --- | --- | --- |
| 400 | 7 | 2 |
| 450 | 22 | 9 |
| 500 | 52 | 27 |
| 550 | 77 | 52 |
| 600 | 93 | 72 |

Methylcyclopentene→Methylcyclopentadiene
3 Moles H₂/Mole Methylcyclopentane
(Methylcyclopentadiene/Methylcyclopentene+Methylcyclopentadiene) ×100

| Temperature | Pressure, 1 Atmosphere | Pressure, 3 Atmospheres |
| --- | --- | --- |
| 400 | 6 | 2 |
| 450 | 20 | 7 |
| 500 | 42 | 20 |
| 550 | 67 | 40 |
| 600 | 88 | 60 |

As will be evident from the above tables, selective dehydrogenation to produce methylcyclopentene is favored by conditions of low temperature and/or high partial pressures of hydrogen, whereas non-selective dehydrogenation to produce methylcyclopentene with substantial amounts of methylcyclopentadiene is favored by conditions of higher temperatures and lower partial pressures of hydrogen. In general, the mild operation is carried out at temperatures between 400–500° C. under moderate pressures and the throughput rate is adjusted such that the conversion of methylcyclopentane to methylcyclopentene does not approach closer than to about 90% of the equilibrium value. The conversion of methylcyclopentane under these conditions is generally less than 30% and the product generally contains less than about 5% methylcyclopentadiene. In the non-selective operation temperatures between 500–600° C. are generally employed; the conversion is generally above 30% and the product may contain from about 5–25% methylcyclopentadiene in addition to the desired methylcyclopentene. While conditions giving intermediate selectivity may be employed, it is generally better to operate under mild conditions to produce a selective conversion or to operate under considerably more severe conditions of temperature and pressure to produce methylcyclopentene with substantial yields of methylcyclopentadiene in addition. As shown in the examples, the concentration of methylcyclopentadiene in the product may be made to equal or exceed the concentration of methylcyclopentene.

The feed material to be dehydrogenated is preferably substantially pure methylcyclopentane such as shown in the above examples. It may, however, contain larger, although minor, amounts of various other hydrocarbons. Cyclohexane, if present, is converted to benzene, and since this is generally undesirable, cyclohexane is preferably removed as far as practical from the feed, e. g., by a relatively efficient fractional distillation.

I claim as my invention:

1. Process for the production of methylcyclopentene which comprises dehydrogenating methylcyclopentane at a temperature between 400° C. and 600° C. with a catalyst consisting essentially of 0.05% to 0.5% platinum incorporated on the surface of a silica gel which is free of alumina impurity.

2. Process for the production of methylcyclopentene which comprises passing vapors of methylcyclopentane over a catalyst consisting of 0.05% to 0.5% platinum incorporated on a silica gel which is free of alumina impurity at a temperature between about 400° C. and about 500° C. and a pressure around 30 p. s. i. g. in the presence of added hydrogen and at a space velocity such that the concentration of methylcyclopentene in the product is limited to less than 90% of that of the thermodynamic equilibrium value, whereby the dehydrogenation of methylcyclopentane to methylcyclopentene is the predominant reaction.

3. Process for the production of methylcyclopentene which comprises passing vapors of methylcyclopentane over a catalyst consisting of 0.05% to 0.5% platinum incorporated in a silica gel which is free of alumina impurity at a temperature between 500° C. and 600° C. in the presence of added hydrogen at a space velocity such that the conversion of methylcyclopentane is at least 30%, whereby at least 5% of methylcyclopentadiene is produced in addition to the desired methylcyclopentene.

4. Process according to claim 1 further characterized in that catalyst is in the form of relatively small pieces having an average diameter not substantially in excess of 3/16 inch.

5. Process according to claim 1 further characterized in that the concentration of platinum in the catalyst is between 0.05% and 0.25% and the alumina impurity is less than 0.1%.

References Cited in the file of this patent

UNITED STATES PATENTS

| | | |
|---|---|---|
| 2,560,329 | Brandon | July 10, 1951 |
| 2,593,446 | Heinemann | Apr. 22, 1952 |
| 2,635,123 | Kennedy | Apr. 14, 1953 |

OTHER REFERENCES

"Dehydrogenation of Methylcyclopentane over Chromia-alumina Catalysts," by Heinz Heinemann, Ind. and Eng. Chem., vol 43, pages 2098 to 2101, September 1951.